United States Patent
Yoon (10) Patent No.: US 11,283,274 B2
(45) Date of Patent: Mar. 22, 2022

(54) APPARATUS FOR BATTERY BALANCING AND BATTERY PACK INCLUDING SAME

(71) Applicant: LG CHEM, LTD., Seoul (KR)

(72) Inventor: Ho-Byung Yoon, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 287 days.

(21) Appl. No.: 16/493,420

(22) PCT Filed: Oct. 24, 2018

(86) PCT No.: PCT/KR2018/012666
§ 371 (c)(1),
(2) Date: Sep. 12, 2019

(87) PCT Pub. No.: WO2019/083282
PCT Pub. Date: May 2, 2019

(65) Prior Publication Data
US 2020/0153262 A1    May 14, 2020

(30) Foreign Application Priority Data

Oct. 27, 2017 (KR) .................. 10-2017-0141282
Oct. 8, 2018 (KR) .................. 10-2018-0120021

(51) Int. Cl.
H01M 10/48    (2006.01)
H02J 7/00    (2006.01)
(Continued)

(52) U.S. Cl.
CPC .......... *H02J 7/0048* (2020.01); *H01M 10/42* (2013.01); *H01M 10/441* (2013.01);
(Continued)

(58) Field of Classification Search
CPC ...... H02J 7/0048; H02J 7/0014; H02J 7/0016; H01M 10/441; H01M 10/482; H01M 10/42
(Continued)

(56) References Cited

U.S. PATENT DOCUMENTS

| | | | |
|---|---|---|---|
| 6,191,555 B1 * | 2/2001 | Konishi | H02J 7/0016 320/118 |
| 7,714,539 B2 * | 5/2010 | Ishikawa | H02J 7/0016 320/116 |

(Continued)

FOREIGN PATENT DOCUMENTS

CN    204012817 U  * 12/2014
JP    2013247772 A  * 12/2013
(Continued)

OTHER PUBLICATIONS

Extended European Search Report, dated Mar. 23, 2020, for European Application No. 18869854.2.
(Continued)

*Primary Examiner* — John T Trischler
(74) *Attorney, Agent, or Firm* — Birch, Stewart, Kolasch & Birch, LLP (57) ABSTRACT

An apparatus including a monitoring unit including a voltage detection circuit which detects a voltage of the plurality of battery cells, a balancing unit including a first common resistor element and a switching module, the first common resistor element connected between a first common node and a second common node, and a control unit operably coupled to the monitoring unit and the switching module, the control unit determining a balancing target including at least one of the plurality of battery cells based on the voltage of each of the plurality of battery cells, and controlling the switching (Continued)

module to form a current channel between the first common resistor element and the balancing target.

13 Claims, 8 Drawing Sheets

(51) Int. Cl.
*H01M 10/44* (2006.01)
*H01M 10/42* (2006.01)
*B60L 58/12* (2019.01)
*B60L 58/22* (2019.01)
*B60L 58/21* (2019.01)

(52) U.S. Cl.
CPC ......... *H01M 10/482* (2013.01); *H02J 7/0014* (2013.01); *B60L 58/12* (2019.02); *B60L 58/21* (2019.02); *B60L 58/22* (2019.02); *H02J 7/0016* (2013.01); *H02J 7/0019* (2013.01)

(58) Field of Classification Search
USPC ....................................................... 320/137
See application file for complete search history.

(56) References Cited

U.S. PATENT DOCUMENTS

| | | | | |
|---|---|---|---|---|
| 7,859,227 B2* | 12/2010 | Saigo | ................ | H01M 10/441 320/136 |
| 8,054,044 B2* | 11/2011 | Kang | ................ | H02J 7/0016 320/118 |
| 8,103,401 B2* | 1/2012 | Kubo | ................ | H02J 7/0016 701/34.1 |
| 8,106,542 B2* | 1/2012 | Lai | ................ | H02J 7/0024 307/150 |
| 8,198,862 B2* | 6/2012 | Zhang | ................ | B60L 58/22 320/118 |
| 8,242,745 B2* | 8/2012 | Zhang | ................ | B60L 58/22 320/119 |
| 8,350,529 B2* | 1/2013 | Loncarevic | ........... | H02J 7/0016 320/122 |
| 8,405,352 B2* | 3/2013 | Lim | ................ | H02J 7/0016 320/122 |
| 8,587,318 B2* | 11/2013 | Chandler | .............. | B60L 3/0046 324/433 |
| 8,643,500 B2* | 2/2014 | Lee | ................ | B60L 58/22 340/636.1 |
| 8,704,488 B2* | 4/2014 | Yun | ................ | H02J 7/0048 320/118 |
| 8,773,070 B2* | 7/2014 | Kang | ................ | H02J 7/0016 320/118 |
| 8,902,072 B2* | 12/2014 | Lee | ................ | G01R 31/28 340/636.1 |
| 8,928,282 B2* | 1/2015 | Kudo | ................ | H01M 10/425 320/118 |
| 9,000,731 B2* | 4/2015 | Biskup | ................ | H02J 7/0031 320/135 |
| 9,018,956 B2* | 4/2015 | Eguchi | ................ | G01R 31/385 324/434 |
| 9,142,980 B2* | 9/2015 | Lee | ................ | H02J 7/0016 |
| 9,201,118 B2* | 12/2015 | Uchida | ................ | G01R 31/392 |
| 9,257,860 B2* | 2/2016 | Kim | ................ | H02J 7/0068 |
| 9,461,495 B2* | 10/2016 | Kim | ................ | H01M 10/486 |
| 9,531,038 B2* | 12/2016 | Thompson | ........ | H01M 10/4207 |
| 9,537,327 B2* | 1/2017 | Lai | ................ | H02J 7/0016 |
| 9,559,528 B2* | 1/2017 | Kim | ................ | H02J 7/0016 |
| 9,647,463 B2* | 5/2017 | Brandl | ................ | H02J 7/0014 |
| 9,735,567 B2* | 8/2017 | Muramoto | ........... | H02J 7/0016 |
| 9,866,049 B2* | 1/2018 | Kim | ................ | H01M 10/443 |
| 9,948,117 B2* | 4/2018 | Lu | ................ | H02J 7/0016 |
| 10,018,683 B2* | 7/2018 | Yoon | ................ | G01R 31/3828 |
| 10,056,653 B2* | 8/2018 | Furukawa | ........... | G01R 31/54 |
| 10,063,071 B2* | 8/2018 | Biskup | ................ | H02J 7/0025 |
| 10,291,038 B2* | 5/2019 | Mei | ................ | H01M 10/441 |
| 10,348,100 B2* | 7/2019 | Cao | ................ | H02J 7/0019 |
| 10,576,844 B2* | 3/2020 | Kim | ................ | B60L 58/22 |
| 10,587,126 B2* | 3/2020 | Ozawa | ................ | H02J 7/0014 |
| 10,630,067 B2* | 4/2020 | Muramoto | ........... | H02H 7/18 |
| 10,693,197 B2* | 6/2020 | Thompson | ........ | H02J 7/0047 |
| 10,811,886 B2* | 10/2020 | Kim | ................ | H01M 10/4207 |
| 11,041,911 B2* | 6/2021 | Pan | ................ | G01R 31/396 |
| 11,050,266 B2* | 6/2021 | Hidaka | ................ | H01M 10/482 |
| 2001/0019256 A1* | 9/2001 | Olsson | ................ | H02J 7/0016 320/118 |
| 2006/0022646 A1* | 2/2006 | Moore | ................ | H02J 7/0029 320/150 |
| 2006/0103349 A1* | 5/2006 | Yamamoto | ........... | H01M 10/482 320/116 |
| 2007/0046260 A1* | 3/2007 | Ishikawa | ............ | H02J 7/0016 320/124 |
| 2007/0247116 A1* | 10/2007 | Morita | ................ | H02J 7/0016 320/132 |
| 2008/0036424 A1* | 2/2008 | Saigo | ................ | H02J 7/0048 320/136 |
| 2009/0096420 A1* | 4/2009 | Lupu | ................ | H02J 7/0016 320/122 |
| 2009/0130541 A1* | 5/2009 | Emori | ................ | H02J 7/0019 429/61 |
| 2009/0195213 A1* | 8/2009 | Li | ................ | H02J 7/0016 320/136 |
| 2009/0261782 A1* | 10/2009 | Morita | ................ | H02J 7/0016 320/118 |
| 2009/0309545 A1* | 12/2009 | Kunimitsu | ........... | G01R 31/396 320/118 |
| 2010/0026241 A1* | 2/2010 | Kang | ................ | H02J 7/0016 320/118 |
| 2010/0085009 A1* | 4/2010 | Kang | ................ | H02J 7/0016 320/118 |
| 2010/0134068 A1 | 6/2010 | Lim | | |
| 2010/0134069 A1* | 6/2010 | Oosawa | ................ | H02J 7/0016 320/118 |
| 2010/0194339 A1* | 8/2010 | Yang | ................ | H02J 7/0016 320/116 |
| 2010/0219837 A1* | 9/2010 | Austerschulte | .... | G01R 31/3835 324/429 |
| 2011/0089897 A1* | 4/2011 | Zhang | ................ | H02J 7/00308 320/116 |
| 2011/0140650 A1* | 6/2011 | Zhang | ................ | B60L 58/22 320/103 |
| 2011/0140665 A1* | 6/2011 | Tamezane | ............ | H02J 7/0016 320/118 |
| 2011/0285539 A1* | 11/2011 | Lee | ................ | H01M 10/441 340/636.1 |
| 2012/0032641 A1* | 2/2012 | Yun | ................ | H02J 7/0016 320/118 |
| 2012/0074906 A1* | 3/2012 | Kang | ................ | H02J 7/0016 320/118 |
| 2012/0086399 A1* | 4/2012 | Choi | ................ | H02J 7/0026 320/116 |
| 2012/0094151 A1* | 4/2012 | Kim | ................ | H02J 7/0091 429/50 |
| 2012/0139491 A1* | 6/2012 | Eberhard | ............ | B60L 3/0046 320/118 |
| 2012/0161707 A1* | 6/2012 | Kim | ................ | H02J 7/0016 320/118 |
| 2012/0194135 A1* | 8/2012 | Mizoguchi | ............. | B60L 58/22 320/118 |
| 2013/0020997 A1* | 1/2013 | Iwasawa | ............ | H01M 10/441 320/116 |
| 2013/0187610 A1* | 7/2013 | Hayashi | ................ | H02J 7/00 320/118 |
| 2013/0187616 A1 | 7/2013 | Chuang et al. | | |
| 2013/0260213 A1* | 10/2013 | Takahashi | ............. | H01M 50/20 429/159 |
| 2013/0293006 A1* | 11/2013 | Kang | ................ | H02J 7/0016 307/10.1 |
| 2014/0042972 A1* | 2/2014 | Kim | ................ | H02J 7/0016 320/118 |
| 2014/0042977 A1 | 2/2014 | Kim | | |

(56) References Cited

U.S. PATENT DOCUMENTS

| | | | |
|---|---|---|---|
| 2014/0055896 A1* | 2/2014 | Muramoto | G01R 31/3835 361/86 |
| 2014/0145651 A1* | 5/2014 | Schiemann | H02J 7/0063 318/139 |
| 2014/0176078 A1* | 6/2014 | Lai | G01R 31/382 320/134 |
| 2014/0253135 A1* | 9/2014 | Eguchi | G01R 31/385 324/434 |
| 2014/0266050 A1* | 9/2014 | Biskup | H02J 7/0025 320/118 |
| 2014/0266062 A1* | 9/2014 | Lee | H01M 10/48 320/134 |
| 2014/0327400 A1* | 11/2014 | Kudo | B60L 50/51 320/118 |
| 2014/0340044 A1* | 11/2014 | Kim | H02J 7/0016 320/134 |
| 2015/0008887 A1* | 1/2015 | Kim | H02J 7/0021 320/136 |
| 2015/0037624 A1* | 2/2015 | Thompson | H01M 10/425 429/50 |
| 2016/0056655 A1 | 2/2016 | Kaneda et al. | |
| 2016/0072315 A1* | 3/2016 | Maltsev | H02J 7/0016 320/118 |
| 2016/0233697 A1 | 8/2016 | Ozawa et al. | |
| 2016/0241052 A1* | 8/2016 | Yang | H02J 7/0048 |
| 2016/0261007 A1* | 9/2016 | Furukawa | G01R 31/52 |
| 2016/0380443 A1* | 12/2016 | Jeon | H02J 7/0014 320/112 |
| 2017/0033571 A1* | 2/2017 | Lu | H02J 7/0014 |
| 2017/0084961 A1* | 3/2017 | Thompson | H02J 7/0016 |
| 2017/0093183 A1* | 3/2017 | Shen | H02J 7/0019 |
| 2017/0110893 A1* | 4/2017 | Cao | H02J 7/0016 |
| 2017/0199250 A1* | 7/2017 | Yoon | G01R 31/3828 |
| 2017/0237269 A1* | 8/2017 | Chang | H02J 7/0021 320/118 |
| 2017/0302069 A1* | 10/2017 | Muramoto | G01R 31/396 |
| 2017/0315181 A1* | 11/2017 | Asakura | G01R 31/396 |
| 2018/0306845 A1* | 10/2018 | Yamaguchi | G01R 19/16542 |
| 2019/0023146 A1* | 1/2019 | Lee | B60L 3/0084 |
| 2019/0074699 A1* | 3/2019 | Yano | H02J 7/0047 |
| 2019/0097434 A1* | 3/2019 | Kim | H01M 10/425 |
| 2019/0109468 A1* | 4/2019 | L Pez et al. | H02J 7/0021 |
| 2019/0135128 A1* | 5/2019 | Kim | H02J 7/0024 |
| 2019/0267815 A1* | 8/2019 | Hidaka | H02J 7/0048 |
| 2019/0317153 A1* | 10/2019 | Pan | G01R 31/3835 |
| 2019/0361075 A1* | 11/2019 | Lee | H01M 10/482 |
| 2020/0036219 A1* | 1/2020 | Yoon | H02J 7/0026 |
| 2020/0044459 A1* | 2/2020 | Lee | H02J 7/0048 |
| 2020/0295578 A1* | 9/2020 | Bober | H02J 7/0021 |
| 2021/0075067 A1* | 3/2021 | Yoon | H01M 10/42 |
| 2021/0151834 A1* | 5/2021 | Ashrafzadeh | G01R 31/396 |
| 2021/0167610 A1* | 6/2021 | Yoon | B60L 58/22 |

FOREIGN PATENT DOCUMENTS

| | | |
|---|---|---|
| JP | 2014-36575 A | 2/2014 |
| JP | 2015-65796 A | 4/2015 |
| JP | 2015-89170 A | 5/2015 |
| JP | 2016-25782 A | 2/2016 |
| JP | 2016-46917 A | 4/2016 |
| JP | 2015-186331 A | 10/2016 |
| KR | 10-2010-0062200 A | 6/2010 |
| KR | 10-2014-0065056 A | 5/2014 |
| KR | 10-2015-0089627 A | 8/2015 |
| KR | 10-2016-0135646 A | 11/2016 |
| KR | 10-2017-0021120 A | 2/2017 |
| KR | 10-2017-0062764 A | 6/2017 |
| KR | 10-1746139 B1 | 6/2017 |

OTHER PUBLICATIONS

International Search Report issued in PCT/KR2018/012666 (PCT/ISA/210), dated Feb. 14, 2019.

* cited by examiner

| Battery cell | Open-circuit voltage(V) |
|---|---|
| $Cell_1$ | 3.5 |
| $Cell_2$ | 3.2 |
| ⋮ | ⋮ |
| $Cell_K$ | 3.2 |
| $Cell_{K+1}$ | 3.6 |
| ⋮ | ⋮ |
| $Cell_n$ | 3.2 |

| Battery cell | Open-circuit voltage(V) |
|:---:|:---:|
| $Cell_1$ | 3.2 |
| $Cell_2$ | 3.2 |
| ⋮ | ⋮ |
| $Cell_K$ | 3.5 |
| $Cell_{K+1}$ | 3.6 |
| ⋮ | ⋮ |
| $Cell_n$ | 3.2 |

APPARATUS FOR BATTERY BALANCING AND BATTERY PACK INCLUDING SAME

TECHNICAL FIELD

The present disclosure relates to an apparatus for balancing battery cells connected in series and a battery pack including the same.

The present application claims priority to Korean Patent Application No. 10-2017-0141282 filed in the Republic of Korea on Oct. 27, 2017 and Korean Patent Application No. 10-2018-0120021 filed in the Republic of Korea on Oct. 8, 2018, the disclosure of which is incorporated herein by reference.

BACKGROUND ART

Recently, there is dramatically growing demand for portable electronic products such as laptop computers, video cameras and mobile phones, and with the intense development of electric vehicles, accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging and discharging, a very low self-discharge rate and high energy density.

More recently, as electric vehicles require high output, a battery pack mounted on an electric vehicle generally includes a plurality of battery modules, each battery module including a plurality of battery cells connected in series. However, because the battery cells cannot have perfectly identical characteristics, as the battery pack is repeatedly charged and discharged, the state of charge imbalance between the battery cells occurs unavoidably. When the repeated charge and discharge of the battery pack continues without solving the imbalance, the battery pack reduces in reversible capacity and degradation of the battery cells included in the battery pack is accelerated.

To solve the above-described problem, Patent Literature 1 forcibly discharges battery cells having higher state of charge to equalize the state of charge between battery cells. However, as shown in FIG. 2 of Patent Literature 1, a balancing circuit including the same number of resistor elements as the battery cells is necessarily required, which increases the entire size of the battery pack. In addition, it is desirable to add a heat dissipation structure into the battery pack to prevent the drastic emission of a lot of heat when simultaneously balancing the plurality of battery cells, but there is a space limitation.

(Patent Literature 1) Korean Patent Publication No. 10-2015-0089627 (published on Aug. 5, 2015)

DISCLOSURE

Technical Problem

The present disclosure is designed to solve the problems such that those described above, and therefore the present disclosure is directed to providing an apparatus for selectively discharging one or two or more of battery cells using a smaller number of resistor elements than the number of battery cells included in a battery pack and a battery pack including the same.

These and other objects and advantages of the present disclosure will be understood by the following description and will be apparent from the embodiments of the present disclosure. Additionally, it will be readily understood that the objects and advantages of the present disclosure are realized by the means set forth in the appended claims and combinations thereof.

Technical Solution

Various embodiments of the present disclosure for achieving the above-described object are as follows.

An apparatus for balancing a plurality of battery cells according to an aspect of the present disclosure includes a monitoring unit including a voltage detection circuit configured to detect a voltage of each of the plurality of battery cells, a balancing unit including a first common resistor element and a switching module, the first common resistor element connected between a first common node and a second common node, and a control unit operably coupled to the monitoring unit and the switching module. The switching module is configured to selectively connect a positive electrode terminal of each battery cell to the first common node. The switching module is configured to selectively connect a negative electrode terminal of each battery cell to the second common node. The control unit is configured to determine a balancing target including at least one of the plurality of battery cells based on the voltage of each of the plurality of battery cells, and control the switching module to form a current channel between the first common resistor element and the balancing target.

The switching module may include a first switching circuit including a plurality of positive switching elements installed between the positive electrode terminal of each battery cell and the first common node, and a second switching circuit including a plurality of negative switching elements installed between the negative electrode terminal of each battery cell and the second common node.

The control unit may be configured to turn on any one of the plurality of positive switching elements connected to the positive electrode terminal of the balancing target and any one of the plurality of negative switching elements connected to the negative electrode terminal of the balancing target, when determining any one of the plurality of battery cells as the balancing target.

The control unit may be configured to turn on any one of the plurality of positive switching elements connected to a highest potential electrode terminal of the balancing target and any one of the plurality of negative switching elements connected to a lowest potential electrode terminal of the balancing target, when determining two or more adjacent battery cells of the plurality of battery cells as the balancing target.

The control unit may be configured to determine a state of charge of each of the plurality of battery cells based on the voltage of each of the plurality of battery cells. The balancing target may include a first battery cell having a maximum state of charge among the plurality of battery cells.

The balancing target may further include a second battery cell connected adjacent to the battery cell having the maximum state of charge. A state of charge of the second battery cell may be higher than a minimum state of charge of the plurality of battery cells.

The control unit may be configured to determine a maximum number of battery cells that can be included in the balancing target based on resistance of the first common resistor element and the voltage of each of the plurality of battery cells.

The balancing unit may further include a first selection switch connected in series to the first common resistor element between the first common node and the second common node, a second common resistor element having a lower resistance than resistance of the first common resistor element, and a second selection switch connected in series to the second common resistor element between the first common node and the second common node.

The control unit may be configured to control the first selection switch and the second selection switch based on a difference between a voltage across the balancing target and a minimum voltage of the plurality of battery cells.

The control unit may be configured to turn on the first selection switch and turn off the second selection switch when the difference between the voltage across the balancing target and the minimum voltage is larger than a first threshold voltage.

The control unit may be configured to turn off the first selection switch and turn on the second selection switch when the difference between the voltage across the balancing target and the minimum voltage is equal to or smaller than the first threshold voltage.

A battery pack according to another aspect of the present disclosure includes the above-described apparatus.

Advantageous Effects

According to at least one of the embodiments of the present disclosure, it is possible to selectively discharge one or two or more of battery cells using a smaller number of resistor elements than the number of battery cells included in a battery pack. Accordingly, it is possible to reduce the overall size of the battery pack compared to the conventional art requiring at least one resistor element for each battery cell.

In addition, according to at least one of the embodiments of the present disclosure, it is possible to suppress overheat caused by balancing without adding a heat dissipation structure to the battery pack by limiting the number of battery cells to simultaneously balance based on the voltage of the battery cells.

The effects of the present disclosure are not limited to the above-mentioned effects, and other effects not mentioned herein will be clearly understood by those skilled in the art from the appended claims.

BRIEF DESCRIPTION OF THE DRAWINGS

The accompanying drawings illustrate preferred embodiments of the present disclosure, and together with the following detailed description, serve to provide a further understanding of the technical aspects of the present disclosure, and the present disclosure should not be construed as limited to the drawings.

MODE FOR CARRYING OUT THE INVENTION

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and variations could be made thereto at the time of filing the application.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of at least one function or operation, and this may be implemented in hardware or software alone or in combination.

In addition, throughout the specification, it will be further understood that when an element is referred to as being "connected to" another element, it can be directly connected to the other element or intervening elements may be present.

Figure 1:
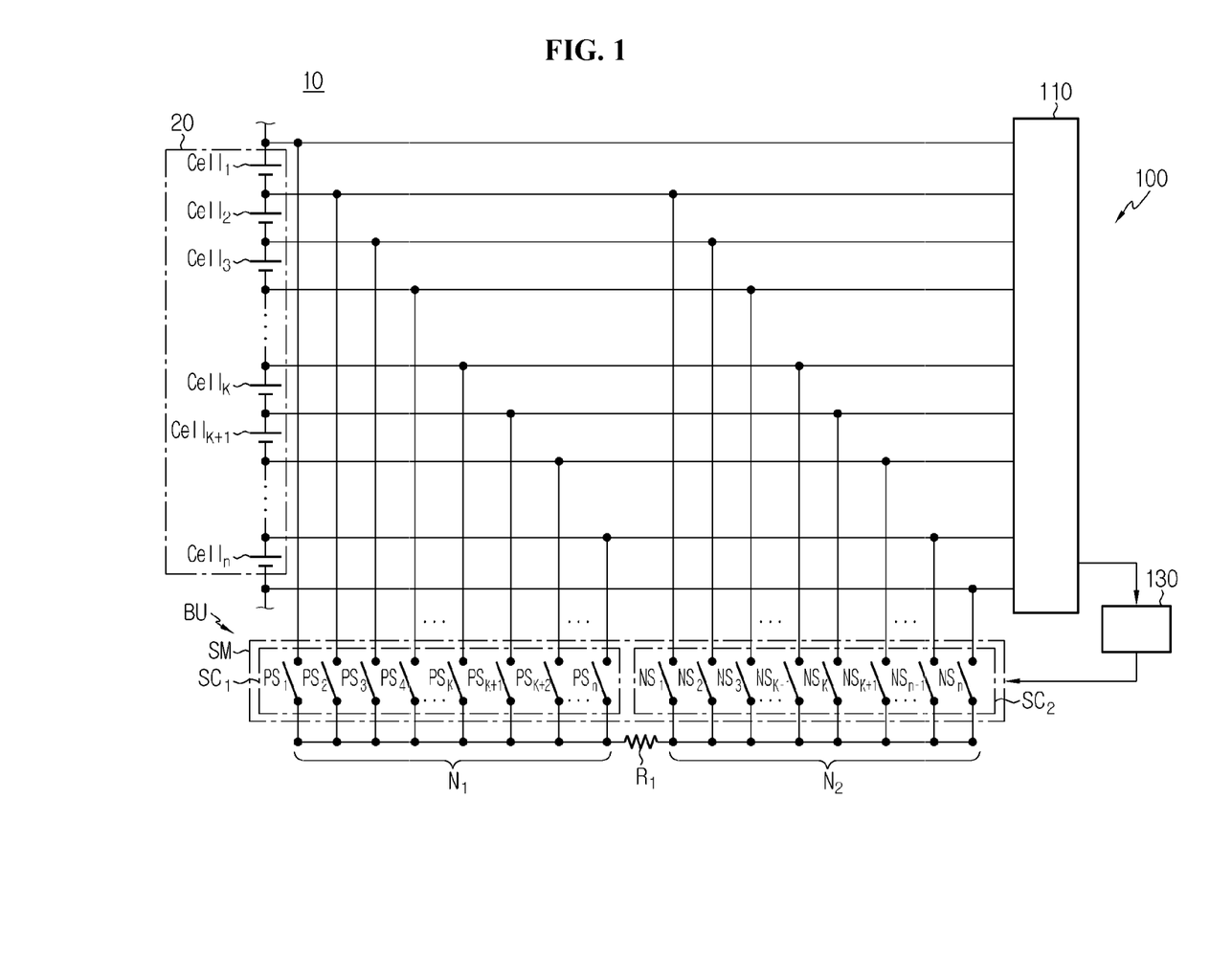
FIG. 1 is a schematic configuration diagram of a battery pack according to a first embodiment of the present disclosure.

FIG. 1 is a schematic configuration diagram of a battery pack according to a first embodiment of the present disclosure.

Referring to FIG. 1, the battery pack 10 includes a battery module 20 and an apparatus 100.

The battery module 20 includes a plurality of battery cells $Cell_1$~$Cell_n$ connected in series. The reference sign n is an integer of 2 or greater, and denotes the total number of battery cells $Cell_1$~$Cell_n$. The apparatus 100 is configured to balance the state of charge between the plurality of battery cells $Cell_1$~$Cell_n$.

The apparatus 100 includes a monitoring unit 110, a balancing unit BU and a control unit 130.

The monitoring unit 110 includes a voltage detection circuit, and optionally, may further include a temperature detection circuit. The voltage detection circuit may include at least one voltage sensor. The voltage detection circuit may be electrically connected to a positive electrode terminal and a negative electrode terminal of each of the plurality of battery cells $Cell_1$~$Cell_n$ included in the battery module 20 through sensing lines, to detect the voltage of each battery cell in a predetermined cycle, and transmit a voltage signal indicating the detected voltage to the control unit 130.

The balancing unit BU includes a common resistor element $R_1$ and a switching module SM. The common resistor element $R_1$ may have a preset resistance. The common resistor element $R_1$ is electrically connected between a first common node $N_1$ and a second common node $N_2$. That is, a first end and a second end of the common resistor element $R_1$ are respectively connected to the first common node $N_1$ and the second common node $N_2$.

The switching module SM is configured to selectively connect the positive electrode terminal of each battery cell to the first common node $N_1$. Along with this, the switching module SM is configured to selectively connect the negative electrode terminal of each battery cell to the second common node $N_2$.

The switching module SM includes a first switching circuit $SC_1$ and a second switching circuit $SC_2$.

The first switching circuit $SC_1$ includes a plurality of positive switching elements $PS_1$~$PS_n$. Each of the plurality of positive switching elements $PS_1$~$PS_n$ has one end electrically connected to the first common node $N_1$. The total number of positive switching elements PS may be equal to the total number of battery cells $Cell_1$~$Cell_n$.

The second switching circuit $SC_2$ includes a plurality of negative switching elements $NS_1$~$NS_n$. Each of the plurality of negative switching elements $NS_1$~$NS_n$ has one end electrically connected to the second common node $N_2$. Each positive switching element PS and each negative switching element NS may be a semiconductor switching device (e.g., MOSFET) that can be controlled using a switching signal. The total number of negative switching elements NS may be also equal to the total number of battery cells $Cell_1$~$Cell_n$.

The positive switching element $PS_i$ (i=1~n) is installed between the positive electrode terminal of the battery cell $Cell_i$ and the first end of the common resistor element $R_1$. When the positive switching element $PS_i$ is turned on, the positive electrode terminal of the battery cell $Cell_i$ is electrically coupled to the first end of the common resistor element $R_1$ through the positive switching element $PS_i$. On the contrary, when the positive switching element $PS_i$ is turned off, the positive electrode terminal of the battery cell $Cell_i$ is electrically separated from the first end of the common resistor element $R_1$.

The negative switching element $NS_i$ is installed between the negative electrode terminal of the battery cell $Cell_i$ and the second end of the common resistor element $R_1$. When the negative switching element $NS_i$ is turned on, the negative electrode terminal of the battery cell $Cell_i$ is electrically coupled to the second end of the common resistor element $R_1$ through the negative switching element $NS_i$. On the contrary, when the negative switching element $NS_i$ is turned off, the negative electrode terminal of the battery cell $Cell_i$ is electrically separated from the second end of the common resistor element $R_1$.

The control unit 130 is operably coupled to the monitoring unit 110 and the switching module SM. The control unit 130 may be physically implemented using at least one of application specific integrated circuits (ASICs), digital signal processors (DSPs), digital signal processing devices (DSPDs), programmable logic devices (PLDs), field programmable gate arrays (FPGAs), microprocessors and electrical units for performing other functions. The control unit 130 may include a memory. The memory stores data, instructions and software required for the entire operation of the apparatus 100, and may include at least one type of storing medium of flash memory type, hard disk type, Solid State Disk (SSD) type, Silicon Disk Drive (SDD) type, multimedia card micro type, random access memory (RAM), static random access memory (SRAM), read-only memory (ROM), electrically erasable programmable read-only memory (EEPROM) and programmable read-only memory (PROM).

The control unit 130 may receive a voltage signal indicating the voltage of each of the plurality of battery cells $Cell_1$~$Cell_n$ from the monitoring unit 110, and based on this, control the first switching circuit $SC_1$ and the second switching circuit $SC_2$ included in the switching module SM respectively. When any one of positive switching elements $PS_1$~$PS_n$ included in the first switching circuit $SC_1$ is turned on, the remaining positive switching elements may be all turned off. When any one of negative switching elements $NS_1$~$NS_n$ included in the second switching circuit $SC_2$ is turned on, the remaining negative switching elements may be all turned off.

The control unit 130 may determine a balancing target including at least one of the plurality of battery cells $Cell_1$~$Cell_n$ based on the voltage (for example, open-circuit voltage) of each of the plurality of battery cells $Cell_1$~$Cell_n$. The voltage signal used for the control unit 130 to determine the balancing target may indicate the Open-Circuit Voltage (OCV) of each of the plurality of battery cells $Cell_1$~$Cell_n$. The control unit 130 may determine the State Of Charge (SOC) of each of the plurality of battery cells $Cell_1$~$Cell_n$ from an OCV—SOC map recorded in the memory based on the voltage of each of the plurality of battery cells $Cell_1$~$Cell_n$ indicated by the voltage signal from the monitoring unit 110. The control unit 130 may include one having the maximum SOC of the plurality of battery cells $Cell_1$~$Cell_n$ in the balancing target. That is, the balancing target may at least include a battery cell having the maximum SOC.

The control unit 130 may determine a maximum number of battery cells that can be simultaneously included in the balancing target based on the resistance of the common resistor element $R_1$ and the voltage of each of the plurality of battery cells $Cell_1$~$Cell_n$. When the balancing unit BU is implemented in the form of an integrated circuit, the upper limit of balancing current that may flow through the common resistor element $R_1$ may be preset, and when the balancing current larger than the upper limit flows, the balancing unit BU may be damaged. Accordingly, the control unit 130 may simultaneously set only the maximum number of battery cells or smaller as the balancing target in a descending order of SOC of the plurality of battery cells $Cell_1$~$Cell_n$.

For example, when the resistance of the common resistor element $R_1$ is 1 kΩ, the upper limit of balancing current is 10 mA, the battery cell $Cell_k$ has the highest voltage of 5.1V and the battery cell $Cell_{k+1}$ has the second highest voltage of 5.0V, the control unit 130 may determine only the battery cell $Cell_k$ as the balancing target by determining 1 as the maximum number. The reason is that when even the battery cell $Cell_{k+1}$ is determined as the balancing target, the balancing current is (5.1V+5.0V)/1 kΩ>10 mA.

In another example, when the resistance of the common resistor element $R_1$ is 1 kΩ, the upper limit of balancing current is 10 mA, the battery cell $Cell_k$ has the highest voltage of 5.0V and the battery cell $Cell_{k+1}$ has the second highest voltage of 4.9V, the control unit 130 may simultaneously determine the battery cell $Cell_k$ and the battery cell $Cell_{k+1}$ as the balancing target by determining 2 as the maximum number. The reason is that even though the battery cell $Cell_k$ and the battery cell $Cell_{k+1}$ are simultaneously determined as the balancing target, the balancing current is (5.0V+4.9V)/1 kΩ<10 mA.

The control unit 130 may control the switching module SM to connect the balancing target in parallel to the common resistor element $R_1$. That is, the control unit 130 may control the switching module SM to form a current channel between the common resistor element $R_1$ and the balancing target.

The balancing operation by the control unit 130 will be described in more detail with reference to FIGS. 2 to 5 below.

Figure 2:
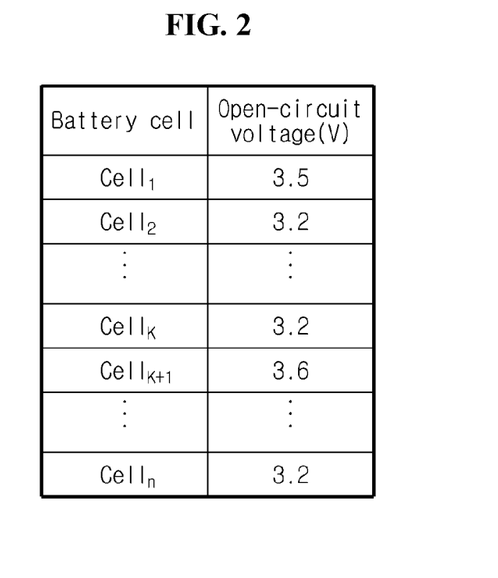
FIG. 2 is a first table exemplarily showing the measured voltages of each of a plurality of battery cells shown in FIG. 1.
Figure 3:
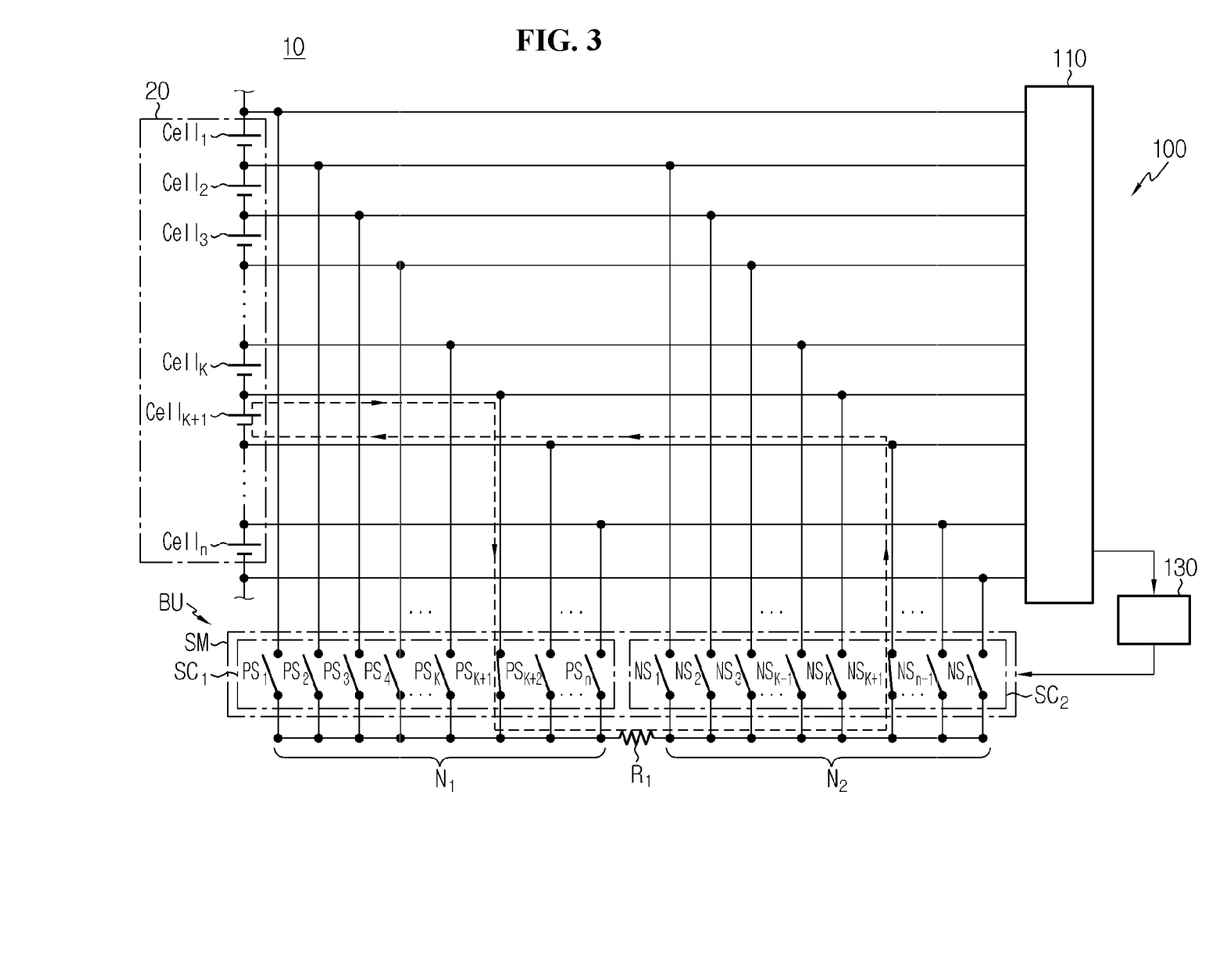
FIG. 3 is a diagram for reference in describing a balancing operation based on the first table of FIG. 2.

FIG. 2 is a first table exemplarily showing the measured voltages of each of the plurality of battery cells shown in FIG. 1, and FIG. 3 is a diagram for reference in describing the balancing operation based on the first table of FIG. 2.

Referring to FIG. 2, the voltage of two battery cells $Cell_1$, $Cell_{k+1}$ of the plurality of battery cells $Cell_1 \sim Cell_n$ is higher than the minimum voltage 3.2V, and the voltage of the remaining battery cells $Cell_2 \sim Cell_k$, $Cell_{k+2} \sim Cell_n$ is equally 3.2V.

Referring to FIGS. 1 to 3, the control unit 130 may include the battery cell $Cell_{k+1}$ having the highest voltage of the plurality of battery cells $Cell_1 \sim Cell_n$ in the balancing target. The voltage and the SOC have a one-to-one correspondence relationship by the OCV—SOC map, and a higher voltage corresponds to a higher SOC. Accordingly, among the plurality of battery cells $Cell_1 \sim Cell_n$, one having the highest voltage and one having the highest SOC may be the same.

The control unit 130 may determine the battery cell $Cell_{k+1}$ having higher voltage 3.6V of the two battery cells $Cell_1$, $Cell_{k+1}$ as the balancing target. The voltage 3.5V of the battery cell $Cell_1$ is higher than the minimum voltage 3.2V, but the battery cell $Cell_1$ is not connected adjacent to the battery cell $Cell_{k+1}$, and thus the control unit 130 does not determine the battery cell $Cell_1$ as the balancing target. That is, when the voltage of each of the plurality of battery cells $Cell_1 \sim Cell_n$ is as shown in FIG. 2, the balancing target determined by the control unit 130 includes only the battery cell $Cell_{k+1}$.

The control unit 130 only turns on the positive switching element $PS_{k+1}$ included in the first switching circuit $SC_1$ and the negative switching element $NS_{k+1}$ included in the second switching circuit $SC_2$, so that the positive electrode terminal and the negative electrode terminal of the battery cell $Cell_{k+1}$ determined as the balancing target are electrically coupled to the first end and the second end of the common resistor element $R_1$ respectively. In this instance, the control unit 130 may simultaneously turn on the positive switching element $PS_{k+1}$ and the negative switching element $NS_{k+1}$, or may turn on one of the positive switching element $PS_{k+1}$ and the negative switching element $NS_{k+1}$ first and then the other. Of course, as described above, the control unit 130 may turn off all the remaining positive switching elements $PS_1 \sim PS_k$, $PS_{k+2} \sim PS_n$ and the remaining negative switching elements $NS_1 \sim NS_k$, $N_{k+2} \sim NS_n$.

Accordingly, as shown in FIG. 3, a closed circuit is formed by the balancing target $Cell_{k+1}$, the positive switching element $PS_{k+1}$, the common resistor element $R_1$ and the negative switching element $NS_{k+1}$, and when the discharge current flows through the closed circuit, the balancing target $Cell_{k+1}$ may be discharged.

Figure 4:
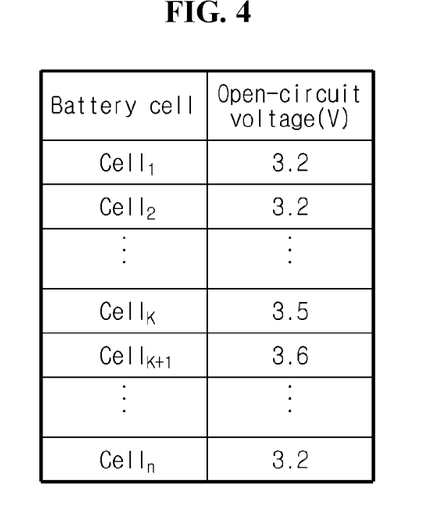
FIG. 4 is a second table exemplarily showing the measured voltages of each of a plurality of battery cells shown in FIG. 1.
Figure 5:
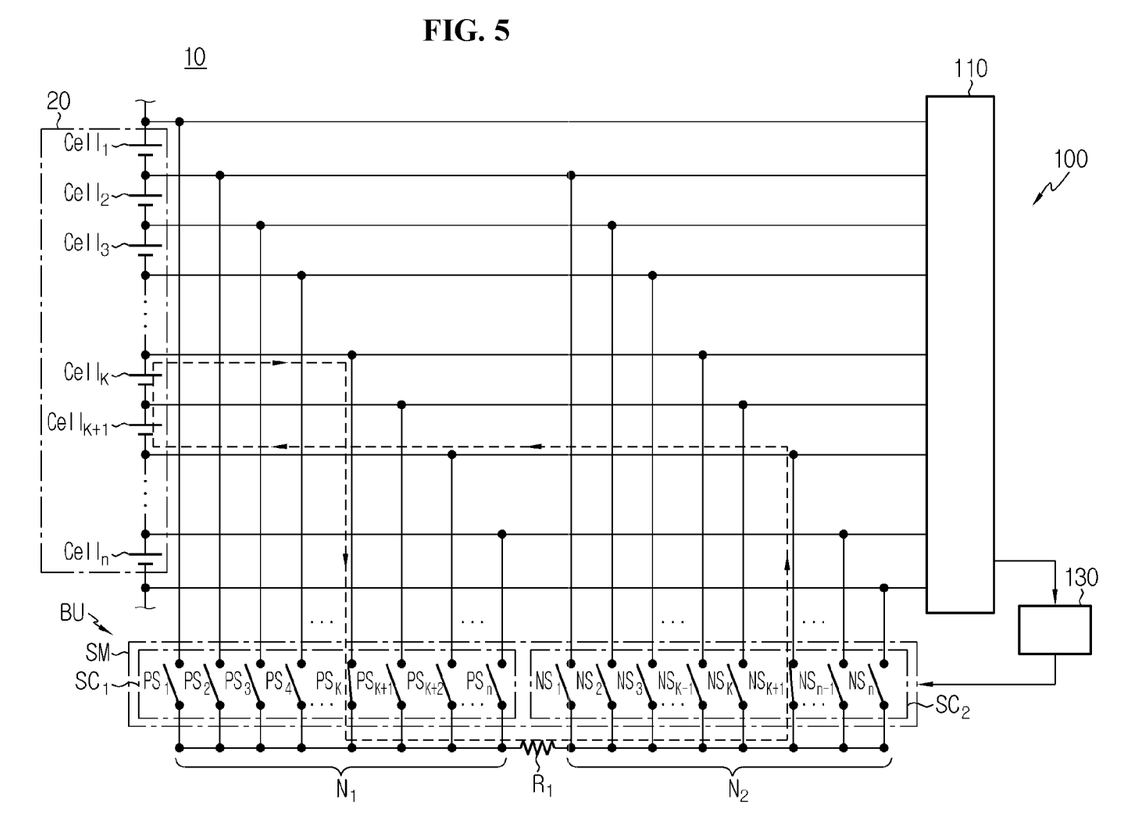
FIG. 5 is a diagram for reference in describing a balancing operation based on the second table of FIG. 4.

FIG. 4 is a second table exemplarily showing the measured voltages of each of the plurality of battery cells shown in FIG. 1, and FIG. 5 is a diagram for reference in describing the balancing operation based on the second table of FIG. 4.

Referring to FIG. 4, dissimilar to FIG. 2, the voltage of two battery cells $Cell_k$, $Cell_{k+1}$ of the plurality of battery cells $Cell_1 \sim Cell_n$ is higher than the minimum voltage 3.2V, and the voltage of each of the remaining battery cells $Cell_2 \sim Cell_{k-1}$, $Cell_{k+2} \sim Cell_n$ is equally 3.2V.

Referring to FIGS. 1, 4 and 5, the control unit 130 may include the battery cell $Cell_{k+1}$ having the highest voltage 3.6V of the plurality of battery cells $Cell_1 \sim Cell_n$ in the balancing target. In addition, the control unit 130 may determine if the battery cell $Cell_{k+1}$ is connected adjacent to the battery cell $Cell_k$. As shown, there is no battery cell connected between the battery cell $Cell_{k+1}$ and the battery cell $Cell_k$, and thus the control unit 130 determines that the battery cell $Cell_k$ and the battery cell $Cell_{k+1}$ are electrically connected adjacent to each other.

Accordingly, the control unit 130 may determine the two battery cells $Cell_k$, $Cell_{k+1}$ as the balancing target. That is, the control unit 130 may include the battery cell $Cell_{k+1}$ having the maximum SOC of the plurality of battery cells $Cell_1 \sim Cell_n$ and at least one battery cell $Cell_k$ connected adjacent to the battery cell $Cell_k$ in the balancing target. In this instance, the SOC of the battery cell $Cell_k$ included in the balancing target is higher than the minimum SOC of the plurality of battery cells $Cell_1 \sim Cell_n$.

The control unit 130 may turn on the positive switching element $PS_k$ connected to a highest potential electrode terminal of the balancing target $Cell_k$, $Cell_{k+1}$ among the plurality of positive switching elements $PS_1 \sim PS_n$ and the negative switching element $NS_{k+1}$ connected to a lowest potential electrode terminal of the balancing target $Cell_k$, $Cell_{k+1}$ among the plurality of negative switching elements $NS_1 \sim NS_n$. In this instance, the 'highest potential electrode terminal' of the balancing target $Cell_k$, $Cell_{k+1}$ may be the positive electrode terminal of the battery cell $Cell_k$ where a highest potential is formed in the balancing target $Cell_k$, $Cell_{k+1}$. In addition, the 'lowest potential electrode terminal' of the balancing target $Cell_k$, $Cell_{k+1}$ may be the negative electrode terminal of the battery cell $Cell_{k+1}$ where a lowest potential is formed in the balancing target $Cell_k$, $Cell_{k+1}$.

That is, the control unit 130 only turns on any one positive switching element $PS_k$ included in the first switching circuit $SC_1$ and any one negative switching element $NS_{k+1}$ included in the second switching circuit $SC_2$, so that the positive electrode terminal of the battery cell $Cell_k$ disposed at the topmost among two or more battery cells $Cell_k$, $Cell_{k+1}$ included in the balancing target and the negative electrode terminal of the battery cell $Cell_{k+1}$ disposed at the bottommost are electrically coupled to the first end and the second end of the common resistor element $R_1$ respectively. In this instance, the control unit 130 may turn on the positive switching element $PS_k$ and the negative switching element $NS_{k+1}$ simultaneously or sequentially one by one. Of course, as described above, the control unit 130 may turn off all the remaining positive switching elements $PS_1 \sim PS_{k-1}$, $PS_{k+1} \sim PS_n$ and the remaining negative switching elements $NS_1 \sim NS_k$, $N_{k+2} \sim NS_n$.

Accordingly, as shown in FIG. 5, a closed circuit is formed by the balancing target $Cell_k$, $Cell_{k+1}$, the positive switching element $PS_k$, the common resistor element $R_1$ and the negative switching element $NS_{k+1}$, and when the discharge current flows through the closed circuit, the balancing target $Cell_k$, $Cell_{k+1}$ may be discharged.

Figure 6:
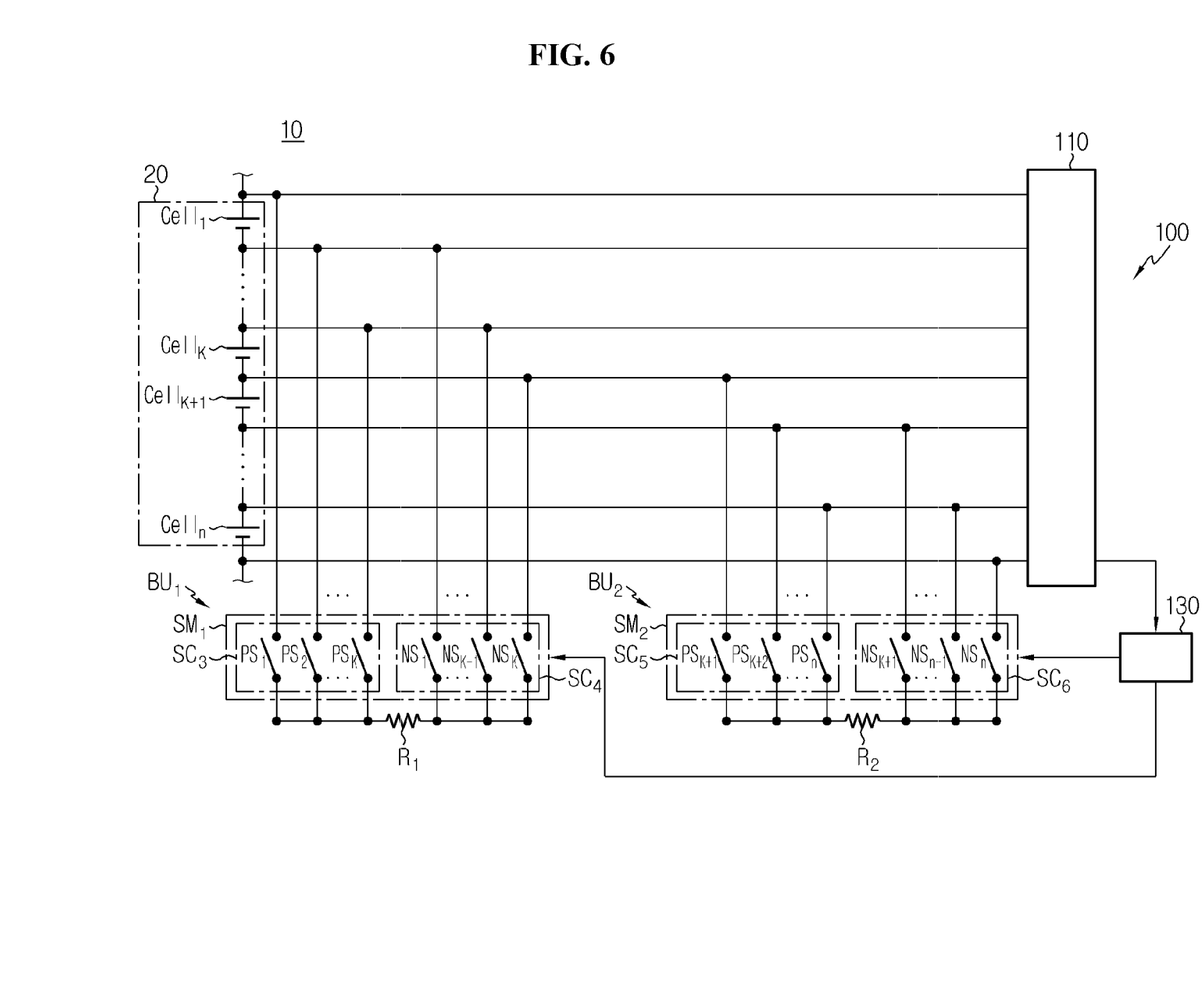
FIG. 6 is a schematic configuration diagram of a battery pack according to a second embodiment of the present disclosure.

FIG. 6 is a schematic configuration diagram of a battery pack according to a second embodiment of the present disclosure.

With regard to the battery pack 10 shown in FIG. 6, abundant descriptions in common with the first embodiment described above with reference to FIG. 1 are omitted herein, and difference(s) will be primarily described.

A difference between the battery pack 10 of the second embodiment and the battery pack 10 of the first embodiment is that the apparatus 100 includes first and second balancing units $BU_1$, $BU_2$ instead of the balancing unit BU.

The first balancing unit $BU_1$ may be used to balance a first battery group $Cell_1$~$Cell_k$ of the plurality of battery cells $Cell_1$~$Cell_n$, and the second balancing unit $BU_2$ may be used to balance a second battery group $Cell_{k+1}$~$Cell_n$ of the plurality of battery cells $Cell_1$~$Cell_n$. The first battery group $Cell_1$~$Cell_k$ and the second battery group $Cell_{k+1}$~$Cell_n$ may be connected in series.

The first balancing unit $BU_1$ includes a first common resistor element $R_1$ and a first switching module $SM_1$. The common resistor element $R_1$ may have a preset resistance. The first switching module $SM_1$ is configured to selectively connect the positive electrode terminal of any one of the plurality of battery cells $Cell_1$~$Cell_k$ and the first end of the first common resistor element $R_1$. Along with this, the first switching module $SM_1$ is configured to selectively connect the negative electrode terminal of any one of the plurality of battery cells $Cell_1$~$Cell_k$ and the second end of the first common resistor element $R_1$.

The first switching module $SM_1$ includes a third switching circuit $SC_3$ and a fourth switching circuit $SC_4$. The third switching circuit $SC_3$ includes a plurality of positive switching elements $PS_1$~$PS_k$. The fourth switching circuit $SC_4$ includes a plurality of negative switching elements $NS_1$~$NS_k$.

The positive switching element $PS_j$ (j=1~k) is installed between the positive electrode terminal of the battery cell $Cell_j$ and the first end of the common resistor element $R_1$. When the positive switching element $PS_j$ is turned on, the positive electrode terminal of the battery cell $Cell_j$ is electrically coupled to the first end of the common resistor element $R_1$. On the contrary, when the positive switching element $PS_j$ is turned off, the positive electrode terminal of the battery cell $Cell_j$ is electrically separated from the first end of the common resistor element $R_1$.

The negative switching element $NS_j$ is installed between the negative electrode terminal of the battery cell $Cell_j$ and the second end of the common resistor element $R_1$. When the negative switching element $NS_j$ is turned on, the negative electrode terminal of the battery cell $Cell_j$ is electrically coupled to the second end of the common resistor element $R_1$. On the contrary, when the negative switching element $NS_j$ is turned off, the negative electrode terminal of the battery cell $Cell_j$ is electrically separated from the second end of the common resistor element $R_1$.

The second balancing unit $BU_2$ includes a second common resistor element $R_2$ and a second switching module $SM_2$. The common resistor element $R_2$ may have a preset resistance that is equal to or different from the resistance of the common resistor element $R_1$. The second switching module $SM_2$ is configured to selectively connect the positive electrode terminal of any one of the plurality of battery cells $Cell_{k+1}$~$Cell_n$ and the first end of the second common resistor element $R_2$. Along with this, the second switching module $SM_2$ is configured to selectively connect the negative electrode terminal of any one of the plurality of battery cells $Cell_{k+1}$~$Cell_n$ and the second end of the second common resistor element $R_2$.

The second switching module $SM_2$ includes a fifth switching circuit $SC_5$ and a sixth switching circuit $SC_6$. The fifth switching circuit $SC_5$ includes a plurality of positive switching elements $PS_{k+1}$~$PS_n$. The sixth switching circuit $SC_6$ includes a plurality of negative switching elements $NS_{k+1}$~$NS_n$.

The positive switching element $PS_m$ (m=k+1 n) is installed between the positive electrode terminal of the battery cell $Cell_m$ and the first end of the second common resistor element $R_2$. When the positive switching element $PS_m$ is turned on, the positive electrode terminal of the battery cell $Cell_m$ is electrically coupled to the first end of the second common resistor element $R_2$. On the contrary, when the positive switching element $PS_m$ is turned off, the positive electrode terminal of the battery cell $Cell_m$ is electrically separated from the first end of the second common resistor element $R_2$.

The negative switching element $NS_m$ is installed between the negative electrode terminal of the battery cell $Cell_m$ and the second end of the second common resistor element $R_2$. When the negative switching element $NS_m$ is turned on, the negative electrode terminal of the battery cell $Cell_m$ is electrically coupled to the second end of the second common resistor element $R_2$. On the contrary, when the negative switching element $NS_m$ is turned off, the negative electrode terminal of the battery cell $Cell_m$ is electrically separated from the second end of the second common resistor element $R_2$.

The control unit 130 is operably coupled to the monitoring unit 110, the first switching module $SM_1$ and the second switching module $SM_2$.

The control unit 130 may receive a voltage signal indicating the voltage of each of the plurality of battery cells $Cell_1$~$Cell_n$ from the monitoring unit 110, and based on this, individually control the third to sixth switching circuits $SC_3$~$SC_6$ included in the first switching module $SM_1$ and the second switching module $SM_2$.

For example, when the voltage of the plurality of battery cells $Cell_{k+1}$~$Cell_n$ is as shown in FIG. 2, the control unit 130 may determine two battery cells $Cell_1$, $Cell_{k+1}$ as the balancing target. The control unit 130 turns on any one positive switching element $PS_1$ included in the third switching circuit $SC_3$ and any one negative switching element $NS_1$ included in the fourth switching circuit $SC_4$, so that the positive electrode terminal and the negative electrode terminal of the balancing target $Cell_1$ are electrically coupled to the first end and the second end of the first common resistor element $R_1$ respectively. In this instance, the control unit 130 may simultaneously turn on the positive switching element $PS_1$ and the negative switching element $NS_1$. Along with this, the control unit 130 turns on any one positive switching element $PS_{k+1}$ included in the fifth switching circuit $SC_5$ and any one negative switching element $NS_{k+1}$ included in the sixth switching circuit $SC_6$, so that the positive electrode terminal and the negative electrode terminal of the balancing target $Cell_{k+1}$ are electrically coupled to the first end and the second end of the second common resistor element $R_2$ respectively. In this instance, the control unit 130 may simultaneously turn on the positive switching element $PS_{k+1}$ and the negative switching element $NS_{k+1}$. As a result, dissimilar to the balancing operation according to FIG. 3, the balancing of the two battery cells $Cell_1$, $Cell_{k+1}$ may be simultaneously accomplished.

In another example, when the voltage of the plurality of battery cells $Cell_{k+1} \sim Cell_n$ is as shown in FIG. 4, the control unit 130 may determine two battery cells $Cell_k$, $Cell_{k+1}$ as the balancing target. The control unit 130 turns on any one positive switching element $PS_k$ included in the third switching circuit $SC_3$ and any one negative switching element $NS_k$ included in the fourth switching circuit $SC_4$, so that the positive electrode terminal and the negative electrode terminal of the balancing target $Cell_k$ are electrically coupled to the first end and the second end of the first common resistor element $R_1$ respectively. In this instance, the control unit 130 may simultaneously turn on the positive switching element $PS_k$ and the negative switching element $NS_k$. Along with this, the control unit 130 turns on any one positive switching element $PS_{k+1}$ included in the fifth switching circuit $SC_5$ and any one negative switching element $NS_{k+1}$ included in the sixth switching circuit $SC_6$, so that the positive electrode terminal and the negative electrode terminal of the balancing target $Cell_{k+1}$ are electrically coupled to the first end and the second end of the second common resistor element $R_2$ respectively. In this instance, the control unit 130 may simultaneously turn on the positive switching element $PS_{k+1}$ and the negative switching element $NS_{k+1}$. As a result, similar to FIG. 5, adjacent two battery cells $Cell_k$, $Cell_{k+1}$ may be simultaneously discharged.

Figure 7:
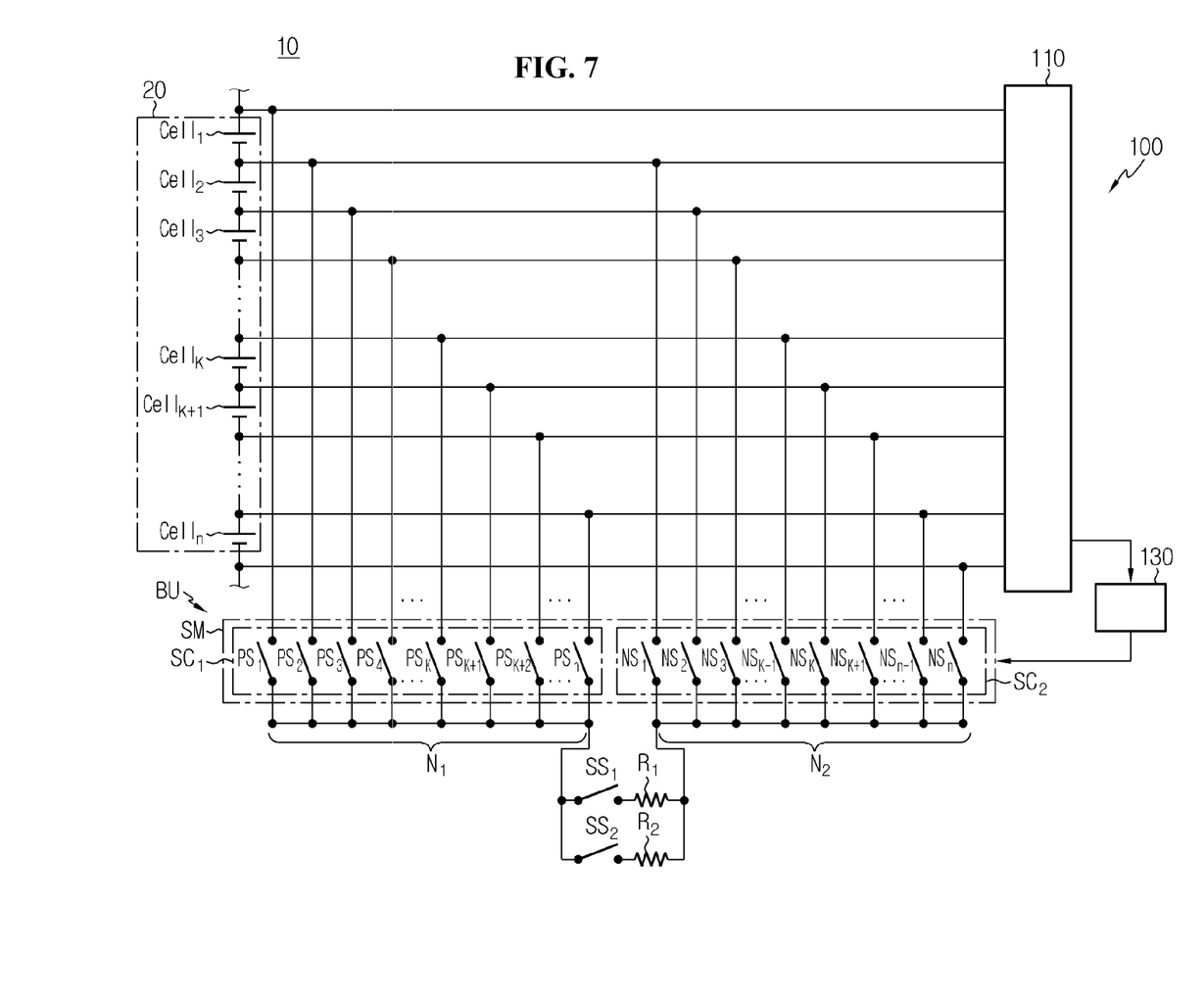
FIG. 7 is a schematic configuration diagram of a battery pack according to a third embodiment of the present disclosure.

FIG. 7 is a schematic configuration diagram of a battery pack according to a third embodiment of the present disclosure.

With regard to the battery pack 10 shown in FIG. 7, abundant descriptions in common with the first embodiment described above with reference to FIG. 1 are omitted herein, and difference(s) will be primarily described.

A difference between the battery pack 10 of the third embodiment and the battery pack 10 of the first embodiment is that the balancing unit BU further includes a second common resistor element $R_2$, a first selection switch $SS_1$ and a second selection switch $SS_2$. The resistance of the first common resistor element $R_1$ may be equal to or higher or lower than the resistance of the second common resistor element $R_2$. Hereinafter, for convenience of description, assume that the resistance (e.g., 1 kΩ) of the first common resistor element $R_1$ is higher than the resistance (e.g., 0.5 kΩ) of the second common resistor element $R_2$.

The first common resistor element $R_1$ and the first selection switch $SS_1$ are connected in series. The first common resistor element $R_1$ may be connected between the first common node $N_1$ and the second common node $N_2$ through the first selection switch $SS_1$. For example, one end of the first selection switch $SS_1$ may be connected to the first common node $N_1$, one end of the first common resistor element $R_1$ may be connected to the second common node $N_2$, and the other end of the first selection switch $SS_1$ may be connected to the other end of the first common resistor element $R_1$.

The second common resistor element $R_2$ and the second selection switch $SS_2$ are connected in series. The second common resistor element $R_2$ is connected between the first common node $N_1$ and the second common node $N_2$ through the second selection switch $SS_2$. For example, one end of the second selection switch $SS_2$ may be connected to the first common node $N_1$, one end of the second common resistor element $R_2$ may be connected to the second common node $N_2$, and the other end of the second selection switch $SS_2$ may be connected to the other end of the second common resistor element $R_2$. That is, the first common resistor element $R_1$ and the second common resistor element $R_2$ are connected in parallel between the first common node $N_1$ and the second common node $N_2$ through the first selection switch $SS_1$ and the second selection switch $SS_2$.

The control unit 130 controls the first selection switch $SS_1$ and the second selection switch $SS_2$ based on a difference between the voltage across the balancing target and the minimum voltage, and now, it will be described in more detail with reference to FIG. 2 together.

The control unit 130 may turn on the first selection switch $SS_1$ connected in series to the first common resistor element $R_1$ and turn off the second selection switch $SS_2$ when a difference between the voltage of the balancing target and the minimum voltage is larger than a first threshold voltage (e.g., 0.3V). For example, as in FIG. 2, when a difference between the voltage 3.6V of battery cell $Cell_{k+1}$ which is the balancing target and the minimum voltage 3.2V is larger than the first threshold voltage (e.g., 0.3V), the control unit 130 may discharge the battery cell $Cell_{k+1}$ by turning on the first selection switch $SS_1$. Accordingly, as electrical energy stored in the battery cell $Cell_{k+1}$ is consumed by the first common resistor element $R_1$, the voltage of the battery cell $Cell_{k+1}$ will be gradually lowered from 3.6V.

The control unit 130 may turn on the second selection switch $SS_2$ connected in series to the second common resistor element $R_2$ and turn off the first selection switch $SS_1$ when a difference between the voltage of the balancing target and the minimum voltage is equal to or smaller than the first threshold voltage (e.g., 0.3V). For example, from the time when the voltage of the battery cell $Cell_{k+1}$ which is the balancing target reaches 3.5V, the battery cell $Cell_{k+1}$ is discharged by the second common resistor element $R_2$ instead of the first common resistor element $R_1$.

The control unit 130 may keep the second selection switch $SS_2$ in turn-on state until a difference between the voltage of the battery cell $Cell_{k+1}$ and the minimum voltage 3.2V reaches 0 V.

Alternatively, the control unit 130 may turn on both the first selection switch $SS_1$ and the second selection switch $SS_2$ until a difference between the voltage of the battery cell $Cell_{k+1}$ and the minimum voltage 3.2V reaches 0 V from the time when a difference between the voltage of the battery cell $Cell_{k+1}$ and the minimum voltage 3.2V reaches a second threshold voltage (e.g., 0.1V) smaller than the first threshold voltage. Accordingly, as electrical energy stored in the battery cell $Cell_{k+1}$ is consumed by the first common resistor element $R_1$ and the second common resistor element $R_2$, the voltage of the battery cell $Cell_{k+1}$ will be gradually lowered toward the minimum voltage 3.2V from 3.5V.

It should be noted that the total resistance of the first common node $N_1$ and the second common node $N_2$ when the first selection switch $SS_1$ and the second selection switch $SS_2$ are turned on, is smaller than the total resistance of the first common node $N_1$ and the second common node $N_2$ when only any one of the first selection switch $SS_1$ and the second selection switch $SS_2$ is turned on.

According to the third embodiment described above with reference to FIG. 7, the apparatus 100 gradually reduces the total resistance of the first common node $N_1$ and the second common node $N_2$ with the decreasing difference between the voltage of the balancing target and the minimum voltage, to stabilize the current flowing through the balancing target.

Figure 8:
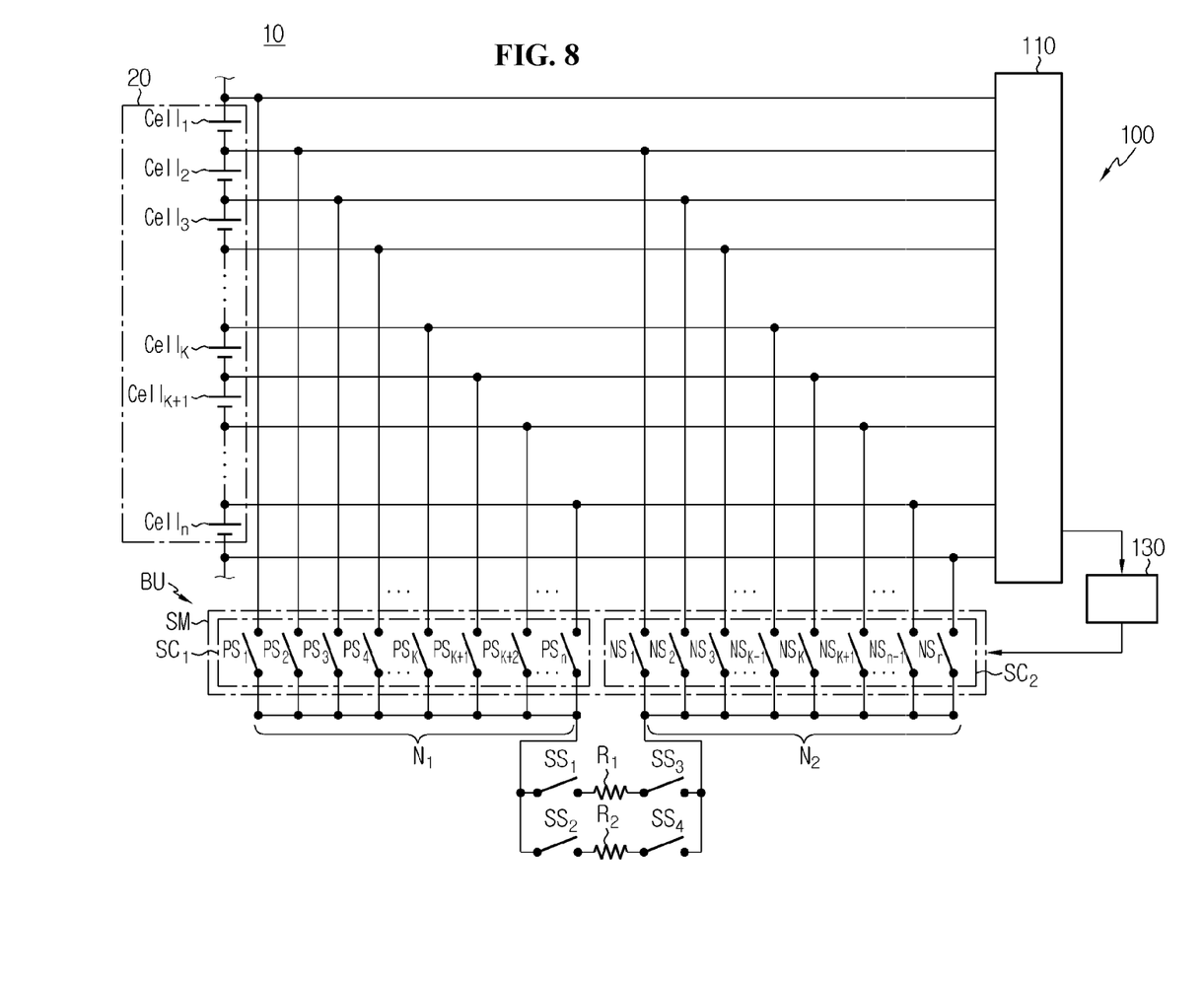
FIG. 8 is a schematic configuration diagram of a battery pack according to a fourth embodiment of the present disclosure.

FIG. 8 is a schematic configuration diagram of a battery pack according to a fourth embodiment of the present disclosure.

With regard to the battery pack 10 shown in FIG. 8, abundant descriptions in common with the third embodiment described above with reference to FIG. 7 are omitted herein, and difference(s) will be primarily described.

A difference between the battery pack 10 of the fourth embodiment and the battery pack 10 of the third embodiment is that the balancing unit BU further includes a third selection switch $SS_3$ and a fourth selection switch $SS_4$.

The third selection switch $SS_3$ is connected in series to the first selection switch $SS_1$ and the first common resistor element $R_1$ between the first common node $N_1$ and the second common node $N_2$.

The fourth selection switch $SS_4$ is connected in series to the second selection switch $SS_2$ and the second common resistor element $R_2$ between the first common node $N_1$ and the second common node $N_2$.

The third selection switch $SS_3$ is provided to protect the battery module 20 and the first common resistor element $R_1$ from a short fault of the first selection switch $SS_1$. The short fault refers to a condition in which the switch cannot be opened. The control unit 130 may be configured to turn on the third selection switch $SS_3$ as well when turning on the first selection switch $SS_1$. The control unit 130 may be configured to turn off the third selection switch $SS_3$ as well when turning off the first selection switch $SS_1$. Accordingly, it is possible to shut off the flow of current through the first common resistor element $R_1$ by turning off the third selection switch $SS_3$ even though the first selection switch $SS_1$ is in short fault.

The fourth selection switch $SS_4$ is provided to protect the battery module 20 and the second common resistor element $R_2$ from a short fault of the second selection switch $SS_2$. The control unit 130 may be configured to turn on the fourth selection switch $SS_4$ as well when turning on the second selection switch $SS_2$. The control unit 130 may be configured to turn off the fourth selection switch $SS_4$ as well when turning off the second selection switch $SS_2$. Accordingly, it is possible to shut off the flow of current through the second common resistor element $R_2$ by turning off the fourth selection switch $SS_4$ even though the second selection switch $SS_2$ is in short fault.

The embodiments of the present disclosure described hereinabove are not implemented only through the apparatus and method, and may be implemented through programs that realize the functions corresponding to the configurations of the embodiments of the present disclosure or recording media having the programs recorded thereon, and this implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

What is claimed is:

1. An apparatus for balancing a plurality of battery cells, comprising:
a monitoring unit including a voltage detection circuit configured to detect a voltage of each of the plurality of battery cells;
a balancing unit including a first common resistor element and a switching module, the first common resistor element connected between a first common node and a second common node; and
a control unit operably coupled to the monitoring unit and the switching module,
wherein the switching module is configured to:
selectively connect a positive electrode terminal of each battery cell to the first common node, and
selectively connect a negative electrode terminal of each battery cell to the second common node, and
wherein the control unit is configured to:
determine a balancing target including at least one of the plurality of battery cells based on the voltage of each of the plurality of battery cells, and
control the switching module to form a current channel between the first common resistor element and the balancing target,
wherein the switching module includes:
a first switching circuit including a plurality of positive switching elements installed between the positive electrode terminal of each battery cell and the first common node; and
a second switching circuit including a plurality of negative switchin elements installed between the negative electrode terminal of each battery cell and the second common node,
wherein the first common resistor element is positioned between the first switching circuit and the second switching circuit,
wherein the plurality of battery cells includes N number of battery cells,
wherein the plurality of positive switching elements includes N number of positive switching elements, and
wherein the plurality of negative switching elements includes N number of negative switching elements.

2. The apparatus according to claim 1, wherein the control unit is configured to turn on any one of the plurality of positive switching elements connected to the positive electrode terminal of the balancing target and any one of the plurality of negative switching elements connected to the negative electrode terminal of the balancing target, when determining any one of the plurality of battery cells as the balancing target.

3. The apparatus according to claim 1, wherein the control unit is configured to turn on any one of the plurality of positive switching elements connected to a highest potential electrode terminal of the balancing target and any one of the plurality of negative switching elements connected to a lowest potential electrode terminal of the balancing target, when determining two or more adjacent battery cells of the plurality of battery cells as the balancing target.

4. The apparatus according to claim 1, wherein the control unit is configured to determine a maximum number of battery cells that can be included in the balancing target based on resistance of the first common resistor element and the voltage of each of the plurality of battery cells.

5. A battery pack comprising the apparatus according to claim 1.

6. The apparatus according to claim 1, wherein the monitoring unit is directly connected to each of the plurality of battery cells, is spaced from each of the plurality of positive switching elements and is spaced from each of the plurality of negative switching elements.

7. The apparatus according to claim 1, wherein the control unit is configured to determine a state of charge of each of the plurality of battery cells based on the voltage of each of the plurality of battery cells, and the balancing target includes a first battery cell having a maximum state of charge among the plurality of battery cells.

8. The apparatus according to claim 7, wherein the balancing target further includes a second battery cell connected adjacent to the battery cell having the maximum state of charge.

9. The apparatus according to claim 8, wherein a state of charge of the second battery cell is higher than a minimum state of charge of the plurality of battery cells.

10. The apparatus according to claim 1, wherein the balancing unit further includes:

a first selection switch connected in series to the first common resistor element between the first common node and the second common node;

a second common resistor element having a lower resistance than resistance of the first common resistor element; and a second selection switch connected in series to the second common resistor element between the first common node and the second common node.

11. The apparatus according to claim 10, wherein the control unit is configured to control the first selection switch and the second selection switch based on a difference between a voltage across the balancing target and a minimum voltage of the plurality of battery cells.

12. The apparatus according to claim 11, wherein the control unit is configured to turn on the first selection switch and turn off the second selection switch when the difference between the voltage across the balancing target and the minimum voltage is larger than a first threshold voltage.

13. The apparatus according to claim 11, wherein the control unit is configured to turn off the first selection switch and turn on the second selection switch when the difference between the voltage across the balancing target and the minimum voltage is equal to or smaller than a first threshold voltage.

* * * * *